United States Patent [19]
Rochelle

[11] 3,878,502
[45] Apr. 15, 1975

[54] ULTRASONIC TEMPERATURE TELEMETRY SYSTEM

[76] Inventor: James M. Rochelle, Rt. 7, Barnard Rd., Knoxville, Tenn. 37921

[22] Filed: June 26, 1973

[21] Appl. No.: 373,712

[52] U.S. Cl.............. 340/5 R; 73/362 AR; 340/206
[51] Int. Cl. .... G01k 7/22; G01k 1/02; H04b 11/00
[58] Field of Search........ 340/5 R, 206; 73/362 AR, 73/339 A, 362 R, 362 SC

[56] References Cited
UNITED STATES PATENTS

| | | | |
|---|---|---|---|
| 3,308,667 | 3/1967 | Pearlman | 73/362 AR |
| 3,333,476 | 8/1967 | Hardy et al. | 73/362 AR |
| 3,534,728 | 10/1970 | Barrows | 73/362 AR |

OTHER PUBLICATIONS
Mitson et al., "Deep Sea Research," Vol. 14, April, 1967, pp. 259–270.

Primary Examiner—Richard A. Farley
Attorney, Agent, or Firm—John A. Horan; David S. Zachry; David E. Breeden

[57] ABSTRACT

A temperature-sensitive implantable fish tag has been provided which employs a sensing thermistor located at the end of a flexible appendage which varies the repetition rate of an acoustic transmitter in proportion to the measured temperature to provide a pulse interval modulated signal transmission. The transmitter circuit includes a class B stage to function as both the oscillator and an acoustic projector driver. The transmitted signal is easily decoded using a commercially available ultrasonic receiver whose output is demodulated by a 50 msec one-shot having a preset trigger threshold which controls a digital time intervalometer and provides echo pulse rejection. With the transmitter implanted in a freely swimming fish, the behavioral responses of the fish to environment temperature may be studied.

10 Claims, 5 Drawing Figures

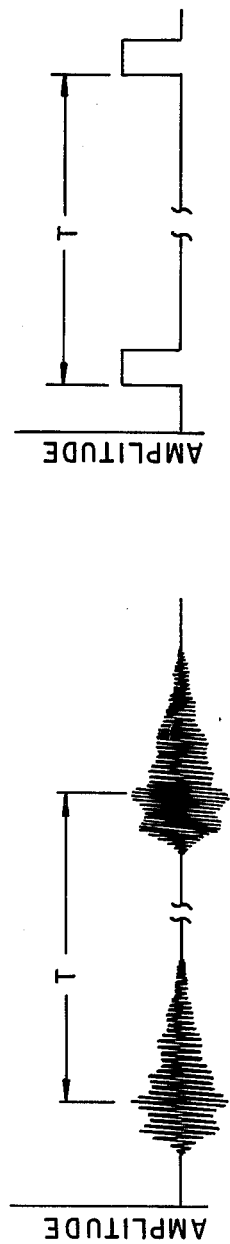
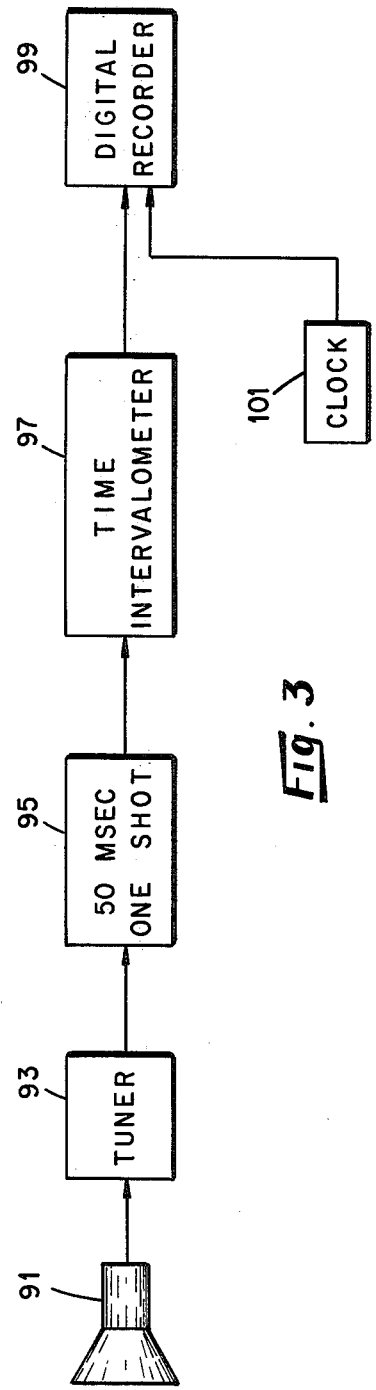
Fig. 3
Fig. 3A
Fig. 3B

ULTRASONIC TEMPERATURE TELEMETRY SYSTEM

BACKGROUND OF THE INVENTION

This invention was made during the course of, or under, a contract with the United States Atomic Energy Comission.

This invention relates generally to underwater acoustic telemetry, and more specifically to a novel miniature underwater acoustic transmitting system especially adaptable for implanting in aquatic animals.

There is a need for a biotelemetry system for studying water temperature habits of various species of aquatic animals in environmental studies of water temperature effects. The basic system requirements are small size and long battery life for the implantable transmitter along with simplicity, low cost, and utilization of existing commercial gear for the receiver.

Although the sophistication of miniature temperature transmitters using electromagnetic propagation has increased rapidly in recent years, improvements in similar devices utilizing acoustic propagation have not been reported. The utilization of acoustical probagation for accurate data transmission through fluids is complicated by the reception of reverberation caused by multipath propagation. This prevents the use of FM/AM (frequency modulated subcarrier/amplitude modulated) or pulse width modulation systems used successfully with electromagnetic propagation. Straight FM modulation is compatible with acoustical transmission but not for transmitting slowly changing variables such as temperature from miniature transmitters having relatively unstable center frequencies.

Having no suitable conventional transmitter design available, an acoustic transmitter incorporating pulse interval modulation has been developed according to the present invention. Basically, the system senses temperature by means of a sensor whose resistance varies as a function of temperature and this resistance controls the repetition rate of a pulse generator (actually a single capacitor complementary multivibrator) which gates "On" and "Off" an ultrasonic carrier frequency oscillator which drives an acoustic projector. The signal acoustically radiated by the projector is composed of brief pulses of carrier frequency transmission separated by much longer intervals of no transmission having time durations which vary with temperature in a measurable and repeatable fashion. The acoustically radiated signal is remotely detected and the pulse interval accurately measured with a digital time intervalometer. Temperature is determined using the aforementioned intervaltemperature relationship.

SUMMARY OF THE INVENTION

In view of the above, it is an object of this invention to provide an acoustic telemeter which may be easily implanted in free ranging small aquatic animals without sacrificing accuracy throughout servce life and which requires only a small quantity of electric power.

Another object of this invention is to provide an acoustic transmitter according to the above object which employs pulse interval modulation of a single transistor stage that operates both as an oscillator and an acoustic projector driver.

Yet another object of this invention is to provide an acoustic telemeter system including a transmitter and receiver design according to the present invention which employs pulse interval modulation of a supersonic carrier signal with echo rejection for accurate transmission and reception of data through a liquid medium.

Other objects and many of the attendant advantages of the present invention will be obvious from the following detailed description of an embodiment of the invention taken in conjunction with the drawings.

BRIEF DESCRIPTION OF THE DRAWINGS

FIG. 3 is a block diagram of an acoustic receiver system according to the invention for use with the transmitter of FIG. 1.

FIG. 3A is a graph of amplitude vs. time of the receiver output of FIG. 3.

FIG. 3B is a graph of amplitude vs. time of the one-shot output of FIG. 3.

DETAILED DESCRIPTION

Figure 1:
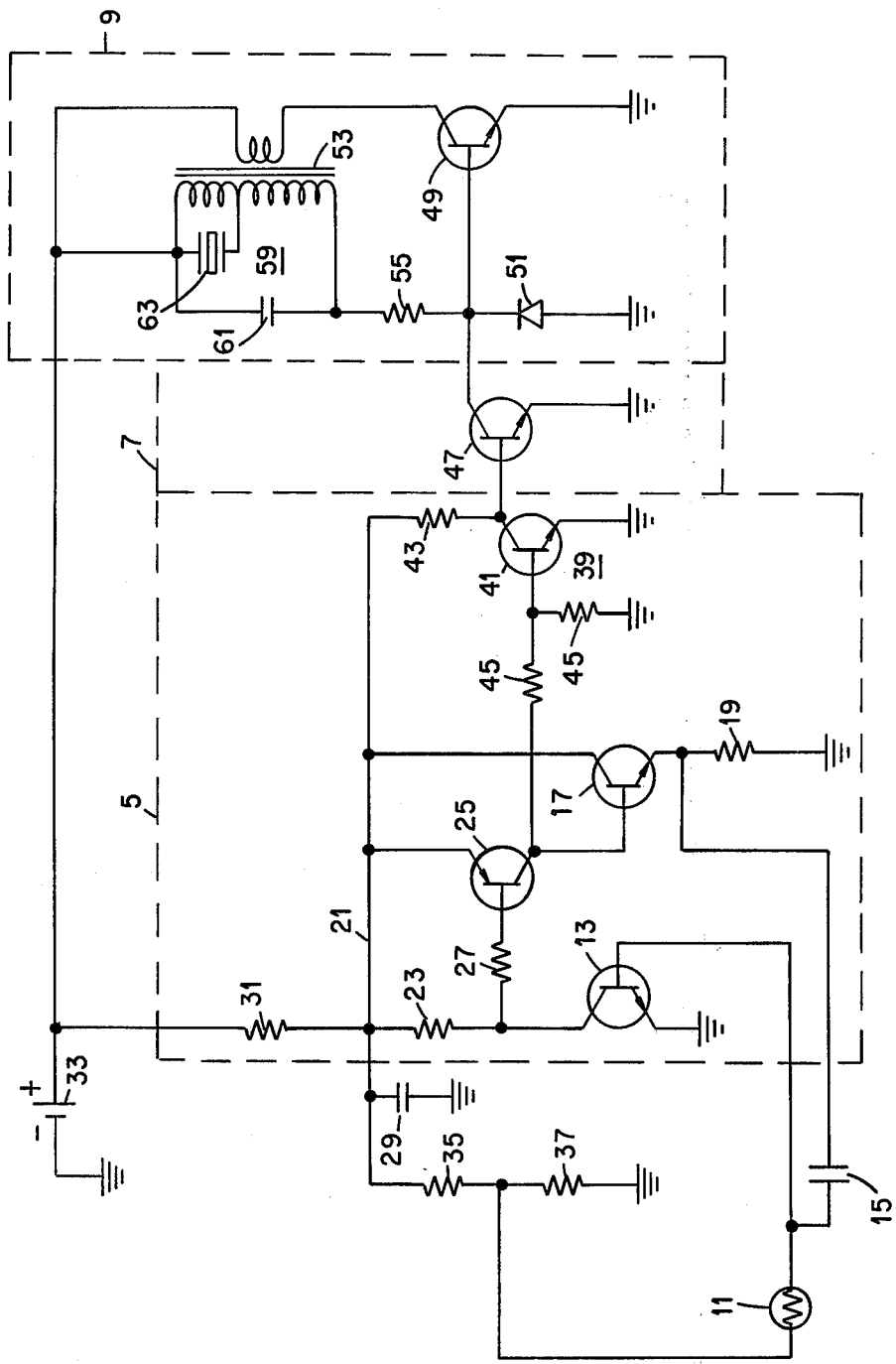
FIG. 1 is a schematic circuit diagram of an acoustic transmitter according to the present invention.

Referring to FIG. 1, there is shown an acoustic transmitter for animal temperature tags for effectively transmitting adequate power to a projector at the desired frequency. The circuit is especially useful for underwater telelmetry and operable at duty cycles down to 0.1 percent, and when gated "On" raises to full output power within 100–200 microseconds.

As shown in FIG. 1, the circuit is composed of three main parts generally indicated by dotted line portions, a modulated circuit 5, a gate circuit 7, and a projector driver and carrier oscillator 9. The sensing element 11, which, for example, in telemetering temperature, may be a thermistor whose resistance changes in proportion to the change in ambient temperature is connected at one end to the base of a transistor 13 and through a capacitor 15 to the emitter of another transistor 17. The emitter of the transistor 13 is connected to ground potential while the emitter of transistor 17 is connected to ground through a biasing resistor 19. The collector of transistor 13 is connected to a power supply line 21 through a biasing resistor 23 while the collector of the transistor 17 is connected directly to line 21. The collector of transistor 13 is further connected to the base of a transistor 25 through a biasing resistor 27. The base of transistor 17 is connected to the collector of transistor 25 whose emitter is connected to line 21. This configuration forms a single capacitor complementary multivibrator.

Line 21 is connected to a filter circuit composed of a capacitor 29 connected between line 21 and ground potential and a resistor 31 connected to the positive side of a power cell 33. The negative side of power cell 33 is connected to ground. Line 21 is further connected to ground through a voltage divider consisting of a pair of series connected resistors 35 and 37. The common connecting point of resistors 35 and 37 is connected to the other side of thermistor 11 to complete the modulating circuit. The output of the multivibrator is taken at the collector of transistor 25 which is connected to an amplifier and signal inverting circuit 39. This circuit includes a transistor 41 which has its emitter connected directly to ground and the collector connected to line 21 through a biasing resistor 43. The output of the multivibrator is connected to the base of transistor 41 through a resistive coupling circuit 45.

The gating circuit 7 includes a transistor 47 in which the base is connected to the collector of transistor 41, the gain adjusted and inverted output of the modulating circuit 5. The collector of transistor 47 is connected to the base of a common emitter class B stage transistor 49. The base of transistor 49 is connected to ground through a diode 51 and one lead of the secondary of a transformer 53 through a resistor 55. The diode 51 ensures a symmetrical waveform at the base of the transistor 49 and prevents reverse breakdown of its base-to-emitter junction. The collector of transistor 49 is connected through the primary winding of transformer 53 to the positive side of power cell 33.

The transformer 53 forms a portion of a tank circuit 59 with the other lead of the secondary winding connected to the positive side of cell 33. A tuning capacitor 61 is connected between the extreme end leads of the secondary winding of transformer 53. The remainder of the tank is formed by a piezoelectric acoustic projector 63 which is connected between the positive side of the secondary winding of transformer 53 and a tap on the secondary winding appropriate to the required drive voltage.

In operation, the single capacitor complementary multivibrator 5, composed of transistors 13, 17, and 25, functions as the modulating section of the transmitter. During an "Off" interval all three transistors are nonconducting and remain so until forward bias is established at the base of transistor 13 by the charging of the capacitor 15 through the temperature sensing thermistor 11. Once started, the collector current of transistor 13 quickly brings transistors 17 and 25 into conduction so that the circuit becomes regenerative and switches to the "On" state with transistor 13 saturated hard by the discharging current through capacitor 15. In about 500 microseconds this current subsides bringing transistor 13 out of saturation, allowing the circuit to regeneratively switch back to the "Off" state.

In practice, the transistor 25 should provide a high current gain to offset the lowered current gain of the saturated transistor 13. Since the circuit must be constructed by integrated circuit techniques to reduce the size and weight, the PNP transistor 25 does not have the high current gain necessary; thus the cascade combination of transistors 25 and 17 comprises a "composite" which satisfies the current gain requirement.

The values of the voltage divider resistors 35 and 37 should be as large as possible to minimize power dissipation; but the parallel combination must be much less than the value of the thermistor 11 to maintain good temperature sensitivity. A total resistance (resistor 35 plus resistor 37) of 100–200 K is a reasonable compromise when using a 500 K at 25°C thermistor. The resistor 35/resistor 37 ratio influences the transistor 13 "Off" time which is approximately equal to the period of the circuit. In practice, a ratio is selected which yields the minimum period change as the supply voltage is varied from about 2.2 to 2.8, thus compensating for the effect of changes in the battery voltage. The resistor 31 and capacitor 29 comprise a filter network that prevents feedback from the projector circuit from affecting the modulating circuit through the battery. The transistor 41 contributes gain and signal inversion to provide the correct polarity for the modulating circuit output pulse.

In the projector circuit, a lead-titanate-zirconate piezoelectric cylinder having a full electrode pattern may be utilized for the acoustic projector 63. When properly coupled to the water, the optimum range for operation is from 75 to 100 kHz. The projector 63 is driven by the gated class B power stage transistor 49 which also functions as the carrier frequency oscillator.

The transmitter oscillator 9 is held "Off" when the modulating circuit 5 is in the "Off" state by clamping the base of transistor 49 near ground through operation of the gate transistor 47 in saturation, which drains about 25 microamps from the battery through the transistor 49 base resistor 55, typically 100 K ohms. By providing a relatively large collector-to-base turns ratio provided by transformer 53, transistor 49's base resistor 55 is allowed to be quite large which keeps the quiescent gating current to a minimum.

The load for transistor 49 consist of the tank circuit 59 which drives the acoustic projector 63 and provides positive feedback to the base of transistor 49.

The frequency of oscillation depends on the tank circuit resonance, as determined by the transformer 53 inductance in conjunction with the projector 63 reactance and the added tuning capacitance 61. The oscillator may be tuned to various frequencies between about 75 and 100 kHz by selecting the proper value for capacitance 61.

The acoustic projector is typically a commercially available lead-titanate-zirconate piezoelectric cylinder (13 mm O.D., 11.5 mm I.D., and 6.4 mm high), having a full electrode pattern and nominal electrode capacitance of 3,000 picofarads. This cylinder has a fundamental mechanical resonance at 800 kHz in the circumferential mode.

As a driver, the primary goal of the output stage 49 is to deliver adequate power to the projector 63 with the maximum possible efficiency. When supplied by 2.7 volts, the transformer 53 develops about 30 volts peak-to-peak across the projector 63 which results in a radiated power level of about 14 milliwatts. With a duty cycle of 0.12, the average transmitter current is 100 μA from the 2.7 volt battery. The transmitter circuit can be supplied from two cells to used, a longer range but shorter life would result.

The transmitter is accordingly seen to radiate periodic pulses of acoustic energy, each having a duration of approximately 500 microseconds and each pulse further propagating at an ultrasonic carrier frequency. The repetition rate of these pulses is designed to depend on the resistance of the sensing thermistor, or in other words, the time between pulses is a measure of the temperature of the thermistor. A typical time-temperature calibration is that time intervals of 1,060 and 490 milliseconds correspond to temperatures of 10° and 25°C, respectively.

Figure 2:
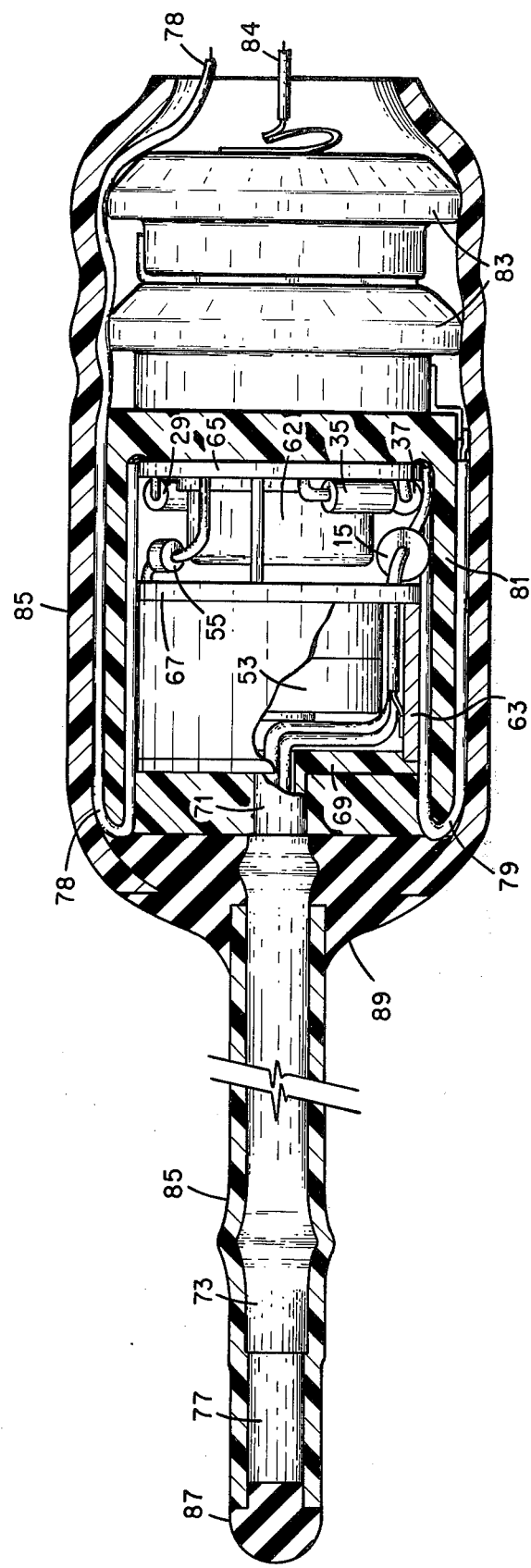
FIG. 2 is a partially sectioned view of a fish tag assembly for the transmitter shown in FIG. 1.

Referring now to FIG. 2, there is shown the encapsulated assembly of the fish tag. Fabrication of the circuits in FIG. 2 in a size suitable for use with small fish requires a custom microcircuit because commercially available circuits are not adaptable. Such a microcircuit might take the form of (a) a custom monolithic circuit, (b) a custom hybrid circuit using thick or thin film techniques, or (c) a chip type hybrid circuit requiring only wire bonding and/or printed circuit capabilities.

Manufacturer-produced custom monolithic circuits are not suitable for low volume applications such as fish tags because of the large minimum order required to cover tooling and initial production costs. The same is true but to a lesser degree for thick or thin film hybrid circuits. In addition, the required size reduction may be difficult to achieve with a film type process.

A technique which has proved both successful and economically feasible in the present application is a wire-bonded hybrid circuit using two commercially available silicon chips. The only microcircuit equipment required with this technique are a thermal-compression ball bonder and an ultrasonic bonder.

With the exception of transistor 41, all the transistors and resistors of the modulating circuit 5 and gate 7 are parts of a 70 × 80 mil breadboard monolithic chip which is eutectically bonded to a 10-pin header. The terminals of each element are connected to oversize bonding pads to facilitate production of the required connection pattern using thermal-compression wire bonding.

The principal disadvantage of the breadboard monolithic chip is the unavailability of the high value resistors required for ultra-low power circuits. Larger resistors could be used by replacing the breadboard chip with individual transistor and resistor chips. Although this approach might allow a lower power control circuit design, it would also increase the circuit size and cost, and decrease the reliability.

A separate transistor chip is used for the transmitter output stage (transistor 49). This transistor chip is mounted on the same header as the breadboard chip by bonding a gold leaf to the header with insulating epoxy and bonding the chip to the gold lead with conductive epoxy. Connections to the gold leaf (collector), base, and emitter are made with an ultrasonic bonder rather than the ball bonder to avoid overheating the epoxies. After testing, the microcircuit is sealed under dry air with an epoxy attached metal cap 63 and then soldered to a 12.7 mm O.D. printed circuit board 65, as shown in FIG. 2.

The transformer 53 is preferably a commercially available ferrite cup core which effectively contains the magnetic field and prevents coupling from the transmitter stage back into the high impedance multivibrator circuit. The transformer 53 is clamped to another 12.7 mm O.D. printed circuit board 67. This board is then stacked above the microcircuit printed circuit board 65 with the external resistors and capacitors mounted between the two as illustrated in FIG. 2. The electrical components are numbered the same as in FIG. 1.

The piezoelectric cylinder 63 is placed around the transformer 53 against board 67 and capped with a plastic disc 69 machined with a tapered fitting 71 which is designed to provide a water-tight seal when mated with a vinyl tube 73 (2.9 mm O.D.) used for the flexible thermistor appendage. The thermistor leads 75 enter the tag through fitting 71 and are attached to the printed circuit board 67.

The thermistor is fitted with AWG 30 teflon coated leads and then dipped in a 1:1 mixture of beeswax and paraffin for moisture sealing. It is then epoxy embedded in a 2.3 mm O.D. plastic cylinder 77 which also has a tapered fitting for attachment of the tubing 73.

After attachment of the thermistor assembly to tube 73 and battery leads 78 and 79 to circuit 65, the tag itself is dipped in the beeswax-paraffin mixture and then cast in epoxy to form a casting 81 for mechanical strength. No wax or epoxy is permitted to enter the space inside the piezoelectric cylinder 63, most of which is occupied by the transformer 53. Overall dimensions of the castings are typically 15 mm O.D. × 19 mm long with a 7.5 cm long thermistor appendage and the weight is approximately 8.9 grams.

After attachment of a two-cell mercury battery 83 with the ground connected to lead 79 and the positive side connected to a lead 84, the entire assembly, including the flexible appendage, is covered with medical grade silicone rubber tubing 85 to ensure biological compatibility. This covering is made from undersized rubber tubing (1.6 mm I.D. for the appendage and 9.5 1 mm I.D. for the tag body) which is expanded to the necessary size by soaking in toluene for about 20 minutes before being placed about the assembly. After vaporization of the toluene the tubing returns to its original size and shrinks tightly around the tag assembly. The open regions at the thermistor tip and at the thermistor end of the tag are filled with silicone rubber adhesive, as at regions 87 and 89, respectively. The battery end of the assembly is temporarily left unsealed giving access to the battery connections 78 and 84. At least 24 hours before implantation of the tag the battery connection is completed by connecting leads 78 and 84 and the remaining opening is also filled with adhesive. To replace an expended battery, the existing rubber tubing and adhesive are easily cut away, the new battery cemented in place, and the tag recovered with new tubing and adhesive.

The ultrasonic pulses from the projector 63 travel through the water and are detectable by a conventional hydrophone 91, as shown in FIG. 3. The hydrophone 91 is disposed in the water where the tagged fish are to be monitored. The output of the hydrophone 91 is connected to the input of a conventional tuner 93 to provide amplified audible beeps, as shown in FIG. 3A, for each input pulse from the transmitter. The output of tuner 93 is connected to the trigger input of a 50-millisecond one-shot multivibrator 95, the purpose of which will be explained hereinbelow. The digital output of one-shot 95 is shown in FIG. 3B. This signal is applied to a conventional time intervalometer 97, such as a digital counter which counts pulses from a crystal controlled oscillator during each time interval T. A digital recorder 99 may be used to record the time interval count at selected intervals from a parallel digital output from the intervalometer 97 along with a time of day recording from a clock 101 connected to the recorder 99. The count registered by the intervalometer 97 during a time interval between transmitter pulses may be read directly from a counter display and converted to temperature from a calibration curve or stored on data tapes by the recorder 99 and subsequently analyzed by a computer which converts time intervals to temperature.

The type of hydrophone 91 used in the receiving system depends on the nature of the experiment. For tagging nonconfined fish which must be located and/or tracked as well as monitored, a hand-held hydrophone may be used which typically has a conical beam pattern of about 8°. For situations where the tagged fish remains within a specific area for several days or more, an omni-directional hydrophone supplied with a pre-amplifier may be used. In either case, the hydrophone 91 signal is detected and amplified by the tuner 93. The outputs from tuner 93 are as shown in FIG. 3A which depicts the envelope of a typical acoustic beep pulse received.

The duration of the received dpulses is governed by the reverberation decay time which is defined as the time required for the received pulse to decay below the noise level. Its value depends on the noise level, the intensity of the transmitted signal, the separation between transmitter and hydrophone, the geometry of the water mass, and the reflective properties of the water mass boundaries. In the rivers, ponds, and lakes used for experimentation, the reverberation decay time has been found to be less than 50 msec.

The task of extracting information from a signal masked by reverberation is easily avoided in the present system by utilizing pulse interval modulation with the restriction that the pulse interval always be greater than the reverberation decay time. With this technique the transmission pulse width remains constant and the pulse interval is made to vary with temperature in a stable and predictable manner.

The pulse interval modulated signal is demodutated by successively starting and stopping the time intervalometer 97 with the digital pulses at time interval T, as shown in FIG. 3B, from the one-shot 95 having a threshold set to trigger when the received signal exceeds a predetermined level, as shown by the peaks at interval T in FIG. 3A.

As the tagged fish moves relative to the receiving hydrophone, changes in the shape of the received pulse cause the precise point on the received signal waveform at which the trigger threshold of one-shot 95 is exceeded to also change. The accuracy of the system depends on the fact that, on the average, the change in trigger point during one interval is negligible. The error produced when the propagation distance from transmitter to hydrophone changes during one interval (the Doppler effect) is greater in an acoustical system than for an electromagnetic system. However, an accuracy of 4 percent/°C may be maintained as long as the relative velocity of the transmitter and receiver does not exceed ±12 meters/sec. in water. Although the instantaneous swimming speed of fish may occasionally exceed this figure, the average relative velocity in a practical experiment has been found to be much less or the fish would soon be completely out of range. Therefore, on the average, errors due to the Doppler effect are also considered to be neglible for the acoustical system.

A particular advantage of the present system is attributed to the use of the 50 msec. one-shot 95. Not only does it provide the required digital signal form for digital time interval measurement by the intervalometer, it provides a deadtime which prevents spurious triggering from echoes which may be received within the 50 msec. switching period of one-shot 95 following a parent transmitter pulse.

It will be seen that a very versatile and accurate ultrasonic telemetry transmitter has been provided which may be easily packaged by conventional potting techniques for implanting in small aquatic animals for underwater temperature telemetry. Further, it will be seen that an acoustic telemetering system has been provided which employs the above transmitter to provide accurate monitoring of the temperature of the body or surrounding water temperature of a freely swimming fish.

What is claimed is:

1. An acoustic temperature telemetering transmitter, comprising:
    a sensor for monitoring the temperature to be telemetered, said sensor being located in heat transfer relation with the temperature to be monitored and having a resistance proportional to temperature;
    a modulating circuit means for producing fixed period modulating pulses at intervals responsive to the resistance of said sensor, said modulating pulses having a period substantially less than said intervals;
    an acoustic projector;
    a gateable oscillator circuit connected to said projector and operable at a carrier frequency when gated "On" sufficient to project acoustic energy from said projector when gated "On"; and
    a gating circuit means connected between said modulating circuit and said oscillator for gating said oscillator "On" for a fixed period equal to the period of said modulating pulses and "Off" for the remaining period of each of said intervals so that said transmitter projects pulses of acoustic energy from said projector at intervals related to said temperature being monitored.

2. An acoustic temperature telemetering transmitter as set forth in claim 1 wherein said gateable oscillator circuit includes a power source, a transformer tank circuit means connected to said projector, an output stage transistor having a base, emitter and collector electrodes, said collector of said output stage being connected in series with a primary winding of said transformer to said power source, said emitter of said output stage transistor being connected to ground potential and said base of said output stage transistor connected to the output of said gating circuit means, and a base resistor connected between said tank circuit and the base of said output stage transistor.

3. An acoustic temperature telemetering transmitter as set forth in claim 2 wherein said tank circuit means further includes a tuning capacitor connected in parallel with a secondary winding of said transformer having one end connected to said power source and the other end connected to said base resistors and wherein said acoustic projector is connected between said power source and an appropriate voltage tap of the secondary winding of said transformer.

4. An acoustic temperature telemetry transmitter as set forth in claim 3 for transmitting acoustic signals through a liquid medium wherein said acoustic projector is a piezoelectric acoustic projector.

5. An acoustic temperature telemetering transmitter as set forth in claim 4 wherein said modulating circuit means includes a complementary multivibrator which switches states in response to the resistance of said sensor.

6. An acoustic temperature telemetering transmitter as set forth in claim 5 wherein said sensor is a thermistor.

7. An underwater acoustic temperature telemetering system, comprising:
    a transmitter located within a temperature varying medium whose temperature is to be monitored, including a sensor for monitoring the temperature to be telemetered, said sensor being located in heat transfer relation with the temperature to be monitored and having a resistance proportional to temperature, a modulating circuit means for producing fixed period modulating pulses at intervals responsive to the resistance of said sensor, said modulating pulses having a period substantially less than said intervals; an acoustic projector, a gateable oscillator circuit connected to said projector and operable at a carrier frequency when gated "On" sufficient to project acoustic energy from said projector when gated "On," and a gating circuit means connected between said modulating circuit and said oscillator for gating said oscillator "On" for a fixed period equal to the period of said modulating pulses and "Off" for the remaining period of each of said intervals so that said transmitter projects pulses of acoustic energy from said projector at intervals related to said temperature being monitored; and a receiver located at a position remote from said temperature varying medium, including a detector means for providing an electrical output in response to the detection of said pulses of acoustic energy from said transmitter, a tuner connected to the output of said detector means and tuned to receive signals at said carrier frequency, a one-shot multivibrator connected to the output of said tuner, said multivibrator having a threshold trigger level set so that said multivibrator triggers corresponding with a selected maximum signal level of each of said pulses of acoustic energy, and a time intervalometer for measuring the time elapsed between each triggering of said multivibrator, said time interval measurement corresponding to the temperature of said medium being monitored.

8. The underwater acoustic temperature telemetering system as set forth in claim 7 wherein said detector means is a hydrophone.

9. The underwater acoustic temperature telemetering system as set forth in claim 8 wherein said time intervalometer is a digital intervalometer and further including a digital recording means connected to said digital intervalometer for recording said time interval measurements.

10. The underwater acoustic temperature telemetering system as set forth in claim 9 wherein said one-shot multivibrator has a preselected switching period less than said timing interval during which said receiver is nonresponsive to acoustic signals, thereby rejecting echo signals following a transmitter pulse.

* * * * *